United States Patent

Kitagawa et al.

[11] Patent Number: 5,329,830
[45] Date of Patent: Jul. 19, 1994

[54] SHIFT CONTROL APPARATUS FOR AUTOMATIC TRANSMISSION FOR VEHICLE

[75] Inventors: Takeshi Kitagawa; Hiroshi Takuma; Shoji Kan; Yoichi Furuichi; Takahiro Taki, all of Kyoto, Japan

[73] Assignee: Mitsubishi Jidosha Kogyo Kabushiki Kaisha, Tokyo, Japan

[21] Appl. No.: 968,830
[22] PCT Filed: Oct. 30, 1992
[86] PCT No.: PCT/JP92/00692
§ 371 Date: Oct. 30, 1992
§ 102(e) Date: Oct. 30, 1992
[87] PCT Pub. No.: WO92/21898
PCT Pub. Date: Dec. 10, 1992

[30] Foreign Application Priority Data

May 31, 1991 [JP] Japan .................. 3-129262

[51] Int. Cl.$^5$ .............................................. F16H 61/08
[52] U.S. Cl. .................................... 477/117; 475/120; 477/34; 477/138
[58] Field of Search ................ 74/863, 866, 867; 475/118, 120, 123, 271, 324

[56] References Cited

U.S. PATENT DOCUMENTS

| | | | |
|---|---|---|---|
| 3,800,629 | 4/1974 | Lentz | 74/864 X |
| 3,881,372 | 5/1975 | Miyauchi et al. | 74/867 |
| 5,010,786 | 4/1991 | Hiramatsu et al. | 74/867 |
| 5,042,328 | 8/1991 | Morishigo et al. | 74/867 X |

FOREIGN PATENT DOCUMENTS

| | | |
|---|---|---|
| 2-21064 | 1/1990 | Japan . |
| 2-120556 | 5/1990 | Japan . |
| 2-120557 | 5/1990 | Japan . |
| 2-120559 | 5/1990 | Japan . |

*Primary Examiner*—Rodney H. Bonck
*Attorney, Agent, or Firm*—Abelman, Frayne & Schwab

[57] ABSTRACT

A shift control apparatus for an automatic transmission of a vehicle wherein a plurality of speed ratios are achieved by electronically controlling individual hydraulic pressures supplied to a plurality of frictional engaging elements to selectively engage these frictional engaging elements, which includes speed ratio select members for changing over the speed ratio of the automatic transmission from a neutral position to a running position, operation condition determination members for determining operation condition of the vehicle, an electromagnetic valve for controlling hydraulic pressure supplied to a first frictional engaging element to achieve a first speed; and electromagnetic valve control members for controlling operation of the electromagnetic valve so that when the speed ratio select members is determined by the operation condition determination means to be slowly manipulated, a supply time of a maximum hydraulic pressure to the first frictional engaging element is extended by a predetermined time, whereby achieving positive starting of the vehicle even when the speed ratio select means is slowly manipulated from the neutral position to a running position.

4 Claims, 7 Drawing Sheets

FIG. 6

| Frictional engaging element \ Speed ratio | N,P | 1st | 2nd | 3rd | 4th | R |
|---|---|---|---|---|---|---|
| Front clutch 20 | | | | ○ | | ○ |
| Rear clutch 21 | | ○ | ○ | ○ | | |
| 4th speed clutch 22 | | | | ○ | ○ | |
| Kickdown brake 23 | | | ○ | | ○ | |
| Low reverse brake 24 | | ● | | | | ○ |

SHIFT CONTROL APPARATUS FOR AUTOMATIC TRANSMISSION FOR VEHICLE

FIELD OF THE INVENTION

This invention relates to a shift control apparatus for an automatic transmission for a vehicle, in which hydraulic pressures supplied to a plurality of frictional engaging elements are individually controlled to achieve a plurality of speed ratios, especially, allowing the driver to achieve positive starting of the vehicle even when the shift lever is slowly operated from the N position to the D position.

BACKGROUND OF THE INVENTION

An automatic transmission for a vehicle selectively supplies hydraulic fluid to frictional engaging elements such as clutches and brakes to connect a desired rotary element in its gear system to an input shaft of the transmission or fix the element to the transmission casing, thereby automatically changing the speed ratio according to operation conditions of the vehicle.

Such an automatic transmission for a vehicle is required to be small in speed-shift shocks to protect various parts and components and maintain comfortable drive feeling. For this purpose, an automatic transmission for a vehicle has been proposed which uses a proper electronic control over the hydraulic pressure and its supply timing to frictional engaging elements, aiming to achieve reduced speed-shift shocks.

As shown in FIG. 5 which shows an example of the structure of such an automatic transmission for a vehicle, a crank shaft 12 of an engine 11 is integrally connected with an impeller 14 of a torque converter 13. The torque converter 13 has the impeller 14, a turbine 15, a stator 16, and a one-way clutch 17. The stator 16 is connected to a transmission casing 18 through the one-way clutch 17. By the function of the one-way clutch, the stator 16 is allowed to rotate in the same direction as the crank shaft 12 but is not allowed to rotate in the reverse direction. The torque transmitted to the turbine 15 is transmitted to the input shaft 19 (hereinafter referred to as the "transmission input shaft") of a gear transmission apparatus to achieve four forward speeds and a single reverse speed disposed at the rear of the torque converter 13.

The gear transmission apparatus comprises three clutches 20, 21, and 22, two brakes 23 and 24, one one-way clutch 25, and one ravigneaux type planetary gear mechanism 26. The ravigneaux type planetary gear mechanism 26 comprises a ring gear 27, a long pinion gear 28, a short pinion gear 29, a front sun gear 30, a rear sun gear 31, and a carrier 32 which rotatably supports the pinion gears 28 and 29 and is rotatably engaged with the transmission input shaft 19.

The ring gear 27 is connected to a transmission output shaft 33. The front sun gear 30 is connected to the transmission input shaft 19 through a kickdown drum 34 and a front clutch 20. Furthermore, the rear sun gear 31 is connected to the transmission input shaft 19 through a rear clutch 21. The carrier 32 is connected to the transmission casing 18 through a low reverse brake 24 and the one-way clutch 25 and to the transmission input shaft 19 through a 4th-speed clutch 22 disposed at the rear end of the gear transmission apparatus. The kickdown drum 34 is integrally connectable to the transmission casing 18 by a kickdown brake 23. Torque passed through the ravigneaux type planetary gear mechanism 26 is transmitted from a drive gear 35 mounted to the transmission output shaft 33 to the drive shaft side of driving wheels (not shown).

The clutches 20 to 22 and the brakes 23 and 24 as frictional engaging elements individually comprise hydraulic mechanisms provided with engaging piston devices or servo mechanisms. These hydraulic mechanisms are operated through a hydraulic control unit (not shown) by hydraulic fluid generated by an oil pump 36 connected to the impeller 14 of the torque converter 13.

Detailed structure and functions of the mechanisms are already known, for example, in Japanese Patent Publication Laid-open 58-54270/1983, 58-46248/1983, or 61-31749/1986. Thus, selective engagement of various frictional engaging elements is achieved according to the position of a shift lever provided beside the driver's seat of the vehicle (not shown) selected by the driver and operation conditions of the vehicle, and various speed ratios are automatically achieved through the hydraulic control unit according to instructions from an electronic control unit to control the operation conditions of the engine 11.

The select pattern of the shift lever includes P (parking), R (reverse), N (neutral), D (automatic three forward speeds or automatic four forward speeds), 2 (automatic two forward speeds), and L (fixed to the 1st speed) positions. With the shift lever set to the D position, when an auxiliary switch (over-drive switch, not shown) is operated, the automatic three forward speeds or the automatic four forward speeds can be selected. The functions of the individual frictional engaging elements when the shift lever is set to the individual positions are shown in FIG. 6. In the figure, symbol "◯" indicates that an engagement condition is achieved by hydraulic operation, and symbol " " indicates that the engaging is achieved only when the L position is selected.

For example, when the shift lever is shifted from the N position to the D position during a standstill condition of the vehicle, from a condition where all of the frictional engaging elements are not engaged, only the rear clutch 21 is newly engaged to achieve the speed ratio of the 1st speed. However, during a standstill condition of the vehicle and when the accelerator pedal is not pressed down, the speed ratio of the 2nd speed is achieved in which further the kickdown brake 23 is lightly engaged, thereby preventing generation of an excessive creeping.

As shown in FIG. 7 which schematically shows the structure of the main portion of the hydraulic circuit in the hydraulic pressure control unit, the rear clutch 21 is connected with a rear clutch exhaust valve 37 through an oil passage 38, and the rear clutch exhaust valve 37 is connected with a N-D control valve 39 through an oil passage 40. The N-D control valve 39 which is supplied with hydraulic oil, of which the maximum pressure is regulated by a relief valve (not shown), from the oil pump 36 through an oil passage 41, and a 1-2 shift valve 44 which connects an oil passage 43 to a kickdown servo 42 which controls the operation of the kickdown brake 23 connect through an oil passage 45, and the 1-2 shift valve 44 is connected to a shift control valve 46 through an oil passage 47. A manual valve 48 which is mechanically linked with operation of the shift lever is connected to an oil passage 49 branched from the oil passage 41 to supply a line pressure to the manual valve 49, and the shift control valve 46 and the manual valve 48 connect through an oil passage 50. An oil passage 51 branched halfway from the oil passage 50 is connected with a hydraulic pressure control valve 52, and the hydraulic pressure control valve 52 is connected also to the N-D control valve 39 through an oil passage 53. Furthermore, the manual valve 48 and the N-D control valve 39 connect through an oil passage 54 branched halfway from the oil passage 51.

The hydraulic pressure control valve 52 supplies the line pressure supplied to the oil passages 50 and 51, adjusted by a reducer valve (now shown) to a lower pressure than the line pressure and controlled to a desired pressure according to the control hydraulic fluid supplied from the oil pump 36, to the oil passage 53 through an oil passage 55. Control hydraulic pressure in the oil passage 55 is adequately discharge-controlled by an oil pressure control electromagnetic valve of a type which closes when unenergized according to an instruction from an electronic control unit (hereinafter described as ECU) 56 so that a desired pressure is obtained.

The shift control valve 46 is controlled by a pair of shift control electromagnetic valves of a type which closes when unenergized of which the combination of actuation conditions is controlled by ECU 56, so that a central spool 60 is select controlled to positions corresponding to the 1st to 4th speed ratios.

In this case, when the shift lever is the N position as shown in FIG. 7, the line pressure from the oil passages 41 and 49 is not supplied to the oil passage 50 and 51 side, the rear clutch 21 and the kickdown brake 23 are not engaged, the transmission input shaft 19 runs idle, and the driving force from the engine 11 is not transmitted to the transmission output shaft 33.

From this condition, when the driver operates the shift lever to select the D position, and when the vehicle is in a standstill condition and the accelerator pedal is not pressured down, as shown in FIG. 8 which shows the relationship between the position of the shift lever at that time, an output signal from an inhibitor switch, a duty ratio of the hydraulic pressure control electromagnetic valve 57, the line pressure and a creep pressure supplied to an engaging side oil chamber 65 of the kickdown servo 42, only the shift control electromagnetic valve 59 of the pair of shift control electromagnetic valves 58 and 59 to control the operation of the shift control valve 46 is energized, and the line pressure from the oil passages 41 and 49 is supplied to the oil passage 50 and 47 through the central spool 60 of the shift control valve 46.

This moves the spool 61 of the 1-2 shift valve 44 to the right in FIG. 7, causing the oil passages 45 and 43 to communicate with each other. Furthermore, at the same time the shift lever is turned over from the N position to the D position, the inhibitor switch is turned on to supply the line pressure from the oil passage 51 to the oil passages 54 and 45, rapidly raising the hydraulic pressure in the oil passage 43 connecting to the kickdown servo 42 in area (1), and to the rear clutch 21 through the oil passages 53, 40, 38 to remove play of the rear clutch 21, reverting it back to the condition immediately before the engagement. In this case, since the rear clutch 21 is pressed by the amount of play, the line pressure in the oil passage 40 is not raised and, in turn, the line pressure in an oil passage 62 is not raised, a spool 63 of the N-D control valve 39 is positioned at the left end, as shown in FIG. 7.

After that, in area (2), the hydraulic pressure control electromagnetic valve 57 is actuated by the duty control, a spool 64 of the hydraulic pressure control valve 52 is intermittently moved to the left side in FIG. 7, causing the oil passage 53 to communicate with an oil discharge port EX of the hydraulic pressure control valve 52. As a result, a hydraulic pressure (hereinafter called the creep pressure), adjusted to a lower pressure than the line pressure from the oil passage 51, is supplied from the oil passage 53 to the N-D control valve 39, and from the oil passage 40 via the rear clutch exhaust valve 37 and the oil passage 38 to the rear clutch 21. This causes the rear clutch 21 to mildly engage, thereby reducing shocks associated with the engagement.

In area (3), the duty ratio of the hydraulic pressure control electromagnetic valve 57 decreases to 0%, and the line pressure from the oil passage 51 is, as is, supplied to the rear clutch 21 via the oil passage 38, achieving a complete engagement of the rear clutch 21. At the same time, the line pressure from the oil passage 51 passes through the oil passage 62 and acts on the left end in FIG. 7 of the spool 63 of the N-D control valve 39. The spool 63 of the N-D control valve 39 moves to the right in FIG. 7 to act on the left end, the oil passage 54 and the oil passage 40 communicate with each other through the oil passage 62, and the oil passage 53 and the oil passage 45 communicate with each other.

After that, in area (4), the duty ratio of the hydraulic pressure control electromagnetic valve 57 temporarily increases to 100%, and the line pressure, which acted into an engaging side oil chamber 65 of the kickdown servo 42, is discharged from an oil discharge port EX of the hydraulic pressure control valve 52 through the oil passage 43, the 1-2 shift valve 44, the oil passage 45, the N-D control valve 39, and the oil passage 53.

Then, in area (5), the hydraulic pressure control electromagnetic valve 57 becomes conductive at a predetermined duty ratio, the creep pressure is supplied from the oil passage 53 to the N-D control valve 39, and the creep pressure is supplied from the oil passage 45 through the 1-2 shift valve 44 and the oil passage 43 to the engaging side oil chamber 65 of the kickdown servo 42. As a result, the kickdown brake 23 moderately engages to achieve the 2nd speed ratio, thereby suppressing generation of an excessive creeping.

In this condition, when the accelerator pedal is pressed down by the driver, both of the pair of shift control electromagnetic valves 58 and 59 become conductive to achieve the 1st speed ratio, the central spool 60 of the shift control valve 46 moves to the right end in FIG. 7 to close the oil passages 50 and 47, the spool 61 of the 1-2 shift valve 44 is pushed back to the left end in FIG. 7, the oil passage 43 becomes communicating with the oil discharge port EX of the 1-2 shift valve 44. This causes hydraulic fluid in the engaging side oil chamber 65 of the kickdown servo 42 to be rapidly discharged through the oil passage 43 from the oil discharge port EX of the 1-2 shift valve 44, and the kickdown brake 23 is released, immediately achieving the 1st speed ratio which engages with only the rear clutch 21.

In a prior art automatic transmission shown in FIGS. 5 to 7, in which a plurality of speed ratios are achieved by electronically controlling individual hydraulic pressures supplied to a plurality of frictional engaging elements to selectively engage these frictional engaging elements, when the shift lever is moved from the N position to the D position under a standstill condition of the vehicle, the position of the shift lever and the output signal of an inhibitor switch (not shown) are synchronized with the moving timing of a spool 66 of the manual valve 48, thereby achieving a smooth shift operation.

However, when the driver moves the shift lever from the N position to the D position very slowly, the output signal of the inhibitor switch changes over before the manual valve 48 moves from the N position to the D position to achieve complete communication between the oil passages 49 and 51, since the hydraulic pressure control unit duty controls the hydraulic control magnetic valve 57 according to the signal from the inhibitor switch, the creep pressure is supplied to the rear clutch 21 side before the spool 63 of the N-D control valve 39 does not completely move to the right in FIG. 7, and the rear clutch 21 tends to fail complete engagement.

Under such a condition, even if the driver presses down the accelerator pedal in order to start the vehicle, the rear clutch 21 tends to slip resulting in a difficulty in starting the vehicle, or deteriorating acceleration of the vehicle.

With a view to eliminate the above prior art problems, it is a primary object of the present invention to provide a shift control apparatus for a vehicle automatic transmission in which individual hydraulic pressures supplied to a plurality of frictional engaging elements are electronically controlled to achieve a plurality of speed ratios, which enables positive starting of the vehicle even when the driver slowly moves the shift lever from the N position to the D position to start the vehicle.

SUMMARY OF THE INVENTION

In accordance with the present invention, there is provided, as a first embodiment, a shift control apparatus for an automatic transmission of a vehicle wherein a plurality of speed ratios are achieved by electronically controlling individual hydraulic pressures supplied to a plurality of frictional engaging elements to selectively engage these frictional engaging elements, comprising speed ratio select means for changing over the speed ratio of the vehicle automatic transmission from a neutral position to a running position, operation condition determination means for determining the operation condition of the vehicle, an electromagnetic valve for controlling a hydraulic pressure supplied to a first frictional engaging element to achieve a first speed, and electromagnetic valve control means for controlling operation of the electromagnetic valve so that when the speed ratio select means is determined by the operation condition determination means to be slowly manipulated, a supply time of a maximum hydraulic pressure to the first frictional engaging element is extended by a first predetermined time.

There is also provided according to the present invention, as a second embodiment, a shift control apparatus for an automatic transmission of a vehicle wherein a plurality of speed ratios are achieved by electronically controlling individual hydraulic pressures supplied to a plurality of frictional engaging elements to selectively engage these frictional engaging elements, comprising operation condition determination means for determining the operation condition of the vehicle, an electromagnetic valve for controlling individual hydraulic pressures supplied to a first frictional engaging element to achieve a first speed ratio and a second frictional engaging element to achieve a second speed ratio in cooperation with the first frictional engaging element, and electromagnetic valve control means for controlling the electromagnetic valve to achieve the second speed ratio when the vehicle is in a standstill condition and the engine is under a low load at the time the speed ratio of the vehicle automatic transmission is changed over from a neutral position to a running position, or when an increase in load on the engine is detected, hydraulic pressure is removed from the second frictional engaging element for a predetermined time and then a maximum hydraulic pressure is supplied to the first frictional engaging element to achieve the first speed ratio.

Thus, in the first embodiment of the present invention, when operation of the speed ratio select means is slow, the electromagnetic valve control means controls the operation of the electromagnetic valve so that the time for supplying a maximum hydraulic pressure to the first frictional engaging element is extended by a first predetermined time.

This enables positive engagement of the first frictional engaging element to achieve the first speed ratio even when hydraulic pressure to the first frictional engaging element to achieve the first speed ratio is low to some degree.

In the second embodiment of the present invention, when the vehicle is in a standstill condition and the engine load is low at the time the speed ratio of the vehicle automatic transmission is changed over from a neutral position to a running position, the electromagnetic valve control means controls the electromagnetic valve to achieve the second speed ratio, or when an increase in load on the engine is detected, the electromagnetic valve control means controls the electromagnetic valve to remove hydraulic pressure from the second frictional engaging element for a predetermined time and then supply a maximum hydraulic pressure to the first frictional engaging element whereby achieving the first speed ratio.

This positively releases the second speed ratio and achieves the first speed ratio when the vehicle starts from a creep control condition at the second speed ratio, thereby enabling smooth starting of the vehicle with minimized shift shocks.

BRIEF DESCRIPTION OF THE DRAWINGS

FIG. 6 is an operation element chart showing the relationship between engagement condition of individual frictional engaging elements and speed ratios.

DETAILED DESCRIPTION OF THE PREFERRED EMBODIMENT

Figure 1:
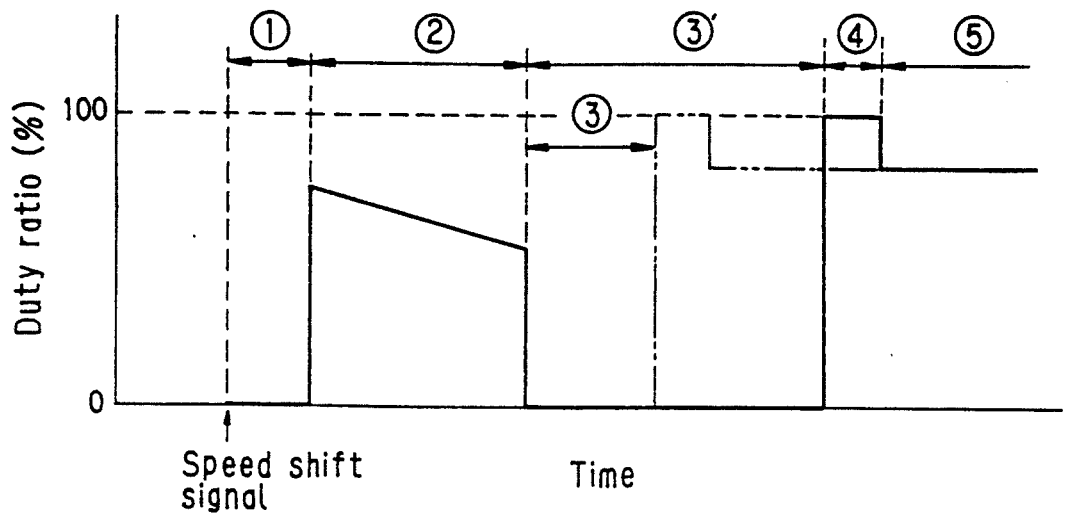
FIG. 1 is a graph showing an example of duty ratio control pattern of a hydraulic pressure control electromagnetic valve in an embodiment in which the shift control apparatus for a vehicle automatic transmission according to the present invention is applied to a vehicle equipped with an automatic transmission of four forward speeds.
Figure 5:
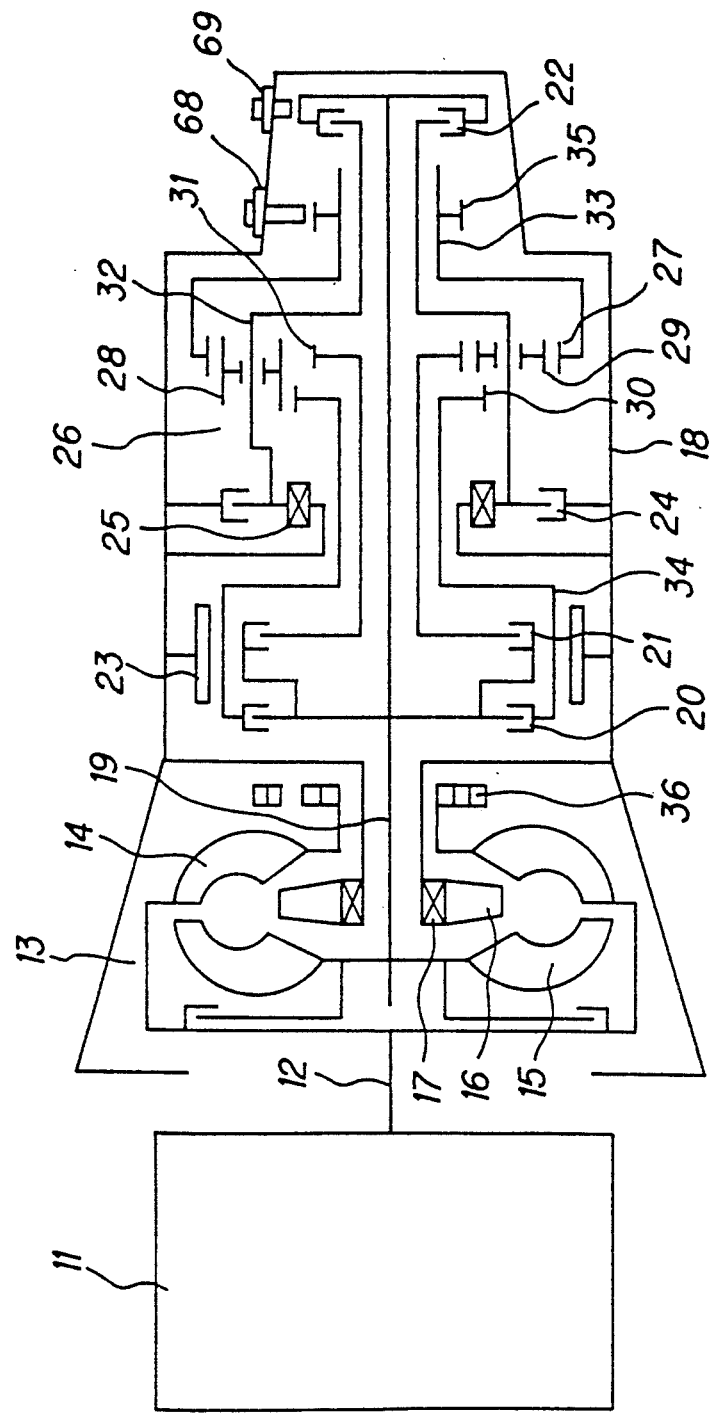
FIG. 5 is a skeletal view showing structure of an automatic transmission of four forward speeds to which the present invention is applied.
Figure 7:
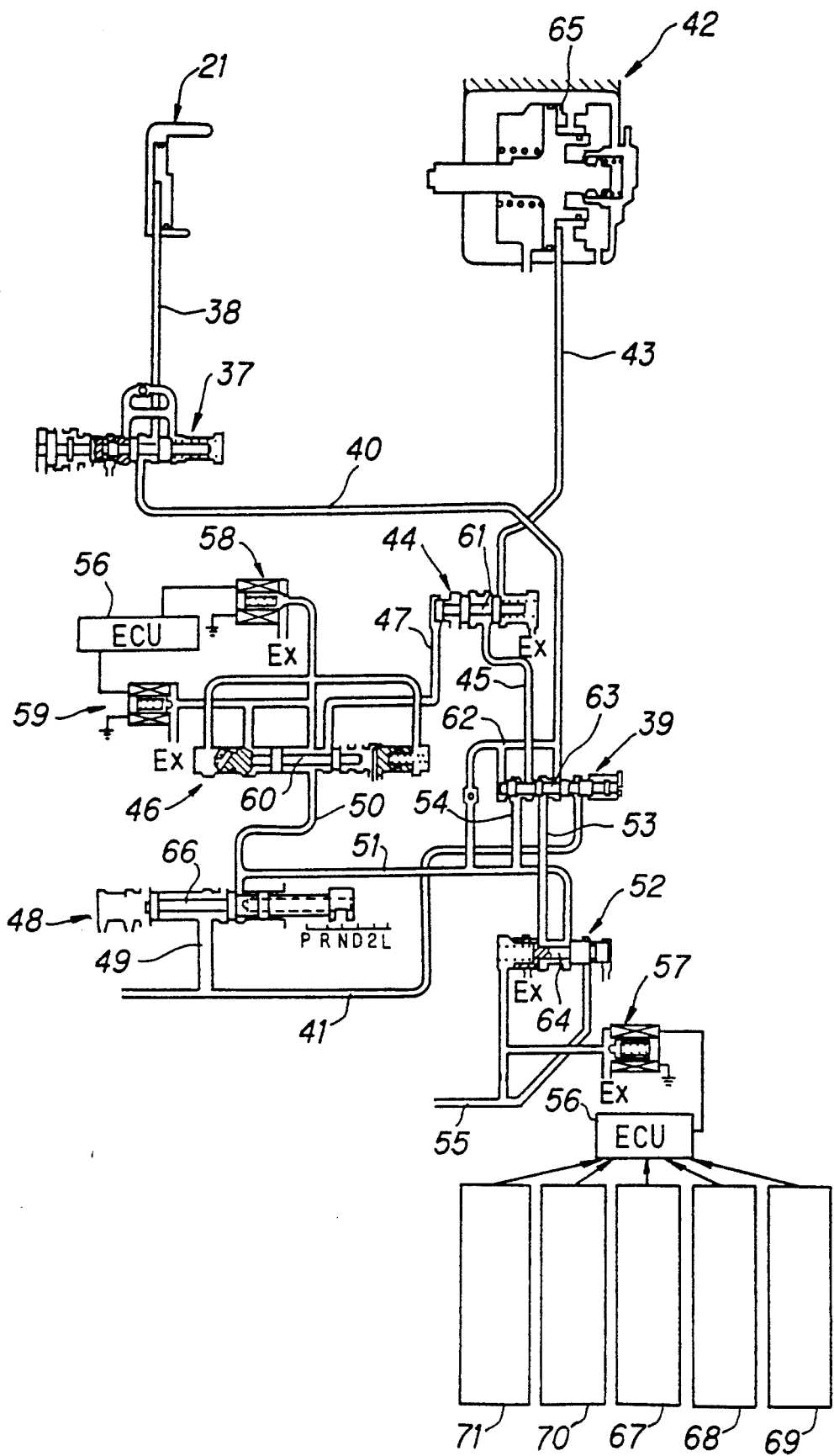
FIG. 7 is a hydraulic circuit diagram showing a main portion of the hydraulic pressure control unit.
Figure 8:
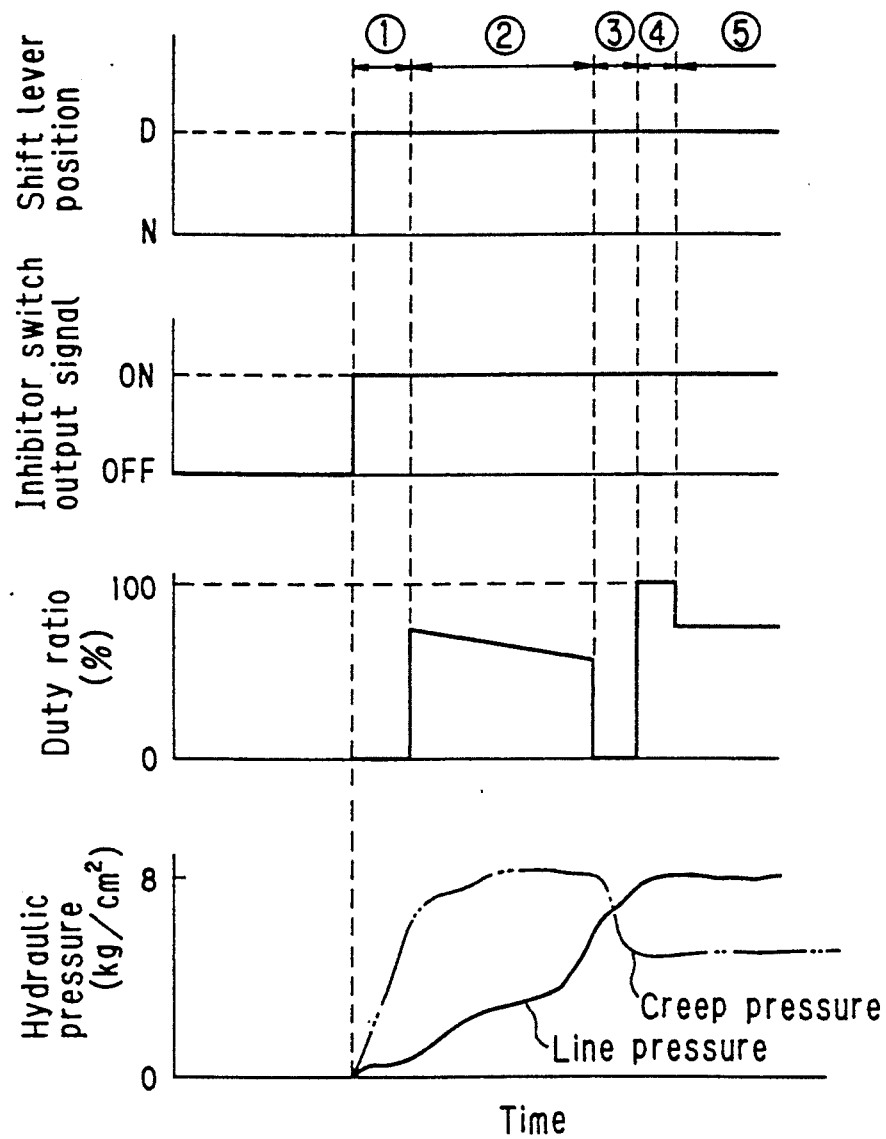
FIG. 8 is a graph showing the relationship between the position of a shift lever, an inhibitor switch signal, the duty ratio of the hydraulic pressure control electromagnetic valve, a line pressure, and a creep pressure.

The shift control apparatus for vehicle automatic transmission according to the present invention can be applied, for example, to a vehicle equipped with an automatic transmission of four forward speeds as shown in FIG. 5 to FIG. 7, in which when the shift lever is operated slowly from an N position to a D position, as shown in FIG. 1 showing an example of control pattern of its hydraulic pressure control electromagnetic valve 57, the duty ratio of the hydraulic pressure control electromagnetic valve 57 is set to 0% to extend area (3), which is a wait time until a rear clutch 21 achieves a complete engagement by a line pressure, to area (3)'. This causes the rear clutch 21 in the course of engagement to go to creep control of (4) and (5), thereby preventing complete engagement failure of the rear clutch 21.

When the vehicle is started from the above creep control condition, both of a pair of shift control electromagnetic valves 58 and 59 are energized in order to achieve a first speed ratio, a central spool 60 of a shift control valve 46 is moved to the left end in FIG. 7 to close oil passages 50 and 47, a spool 61 of a 1-2 shift valve 44 is pushed back to the left end in FIG. 7, and an oil passage 43 beocmes communicating with an oil discharge port EX of the 1-2 shift valve 44. As a result, hydraulic fluid in an engaging side oil chamber 65 of a kickdown servo 42 is rapidly discharged to release a kickdown brake 23, thereby immediately achieving the 1st speed ratio in which only the rear clutch 21 engages.

At this moment, a spool 63 of an N-D control valve 39 is required to have moved to the D position side (the right side in FIG. 7) corresponding to the position change of a shift lever from the N position to D position. In order to positively achieve this, the duty ratio of the hydraulic pressure control valve 57 is maintained at 0% for a predetermined time to exert the high line pressure on the oil passage 62 through the oil passage 53, thereby moving the spool 63 of the N-D control valve 39 to the right.

However, when the change-over operation of the shift lever from the N position to the D position is even further slowly performed so that the shift lever is stopped between the N position and the D position, since the amount of hydraulic fluid discharged from a manual valve 48 is limited, there may occur a defect that the rear clutch 21 cannot be completely engaged, even with the extension control over the waiting time until complete engagement of the rear clutch 21, and such defect makes the N-D control valve 39 unable to move to the right side, then allowing the N-D control valve to remain at the left-end position.

Figure 2:
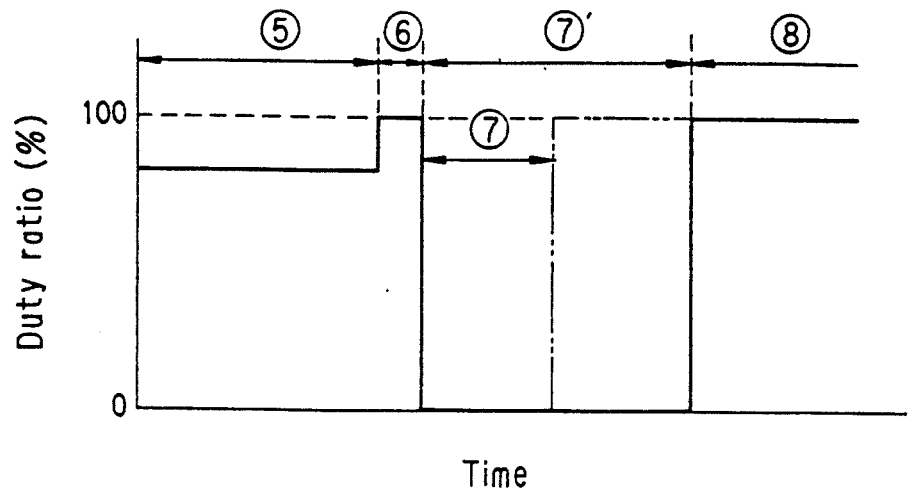
FIG. 2 is a graph showing an example of duty ratio control pattern of a hydraulic pressure control electromagnetic valve at starting of the vehicle.

Then, as shown in FIG. 2(7)', the time to set the duty ratio of the hydraulic pressure control electromagnetic valve 57 to 0% is extended to secure through hydraulic pressure to be supplied for the hydraulic fluid paths 40 and 62 for positively supplying the line pressure to the rear clutch 21, thereby enabling the rear clutch 21 to achieve complete engagement and the spool 63 of the N-D control valve 39 to achieve positive movement to the right, in order to prevent poor starting and deterioration in acceleration. After that, in area (8), the duty ratio of the hydraulic pressure control electromagnetic valve 57 is set to 100% to complete the starting control.

In this case, when a shift instruction to the 1st speed is outputted to release from the creep control, the duty ratio of the hydraulic pressure control electromagnetic valve 57 is temporarily set to 100% in area (6) shown in FIG. 2. This operation will be briefly described below.

Normally, in the shift control from the creep control to the first speed ratio, a simple shift from (5) in FIG. 2 to (7) or (7)' has no problem. However, for a case when the viscosity of automatic transmission fluid is high at low temperatures or the like, moving of the 1-2 shift valve 44 to the first speed ratio side (left side in FIG. 7) in association with operation of the hydraulic pressure control electromagnetic valve 57 tends to delay, and if the above control is performed in such a case, the line pressure will be supplied to the kickdown servo 42. As a result, the 2nd speed ratio will temporarily be achieved and then the speed ratio will return to the 1st speed ratio, resulting in shift shocks.

Therefore, as shown in FIG. 2(6), the duty ratio of the hydraulic pressure control electromagnetic valve 57 is set to 100% for a moment to discharge hydraulic pressure in the kickdown servo 42 from the oil discharge port EX of the hydraulic pressure control valve 52 through the N-D control valve 39, thereby preventing the problem of achieving the 2nd speed ratio, even if the 1-2 shift valve 44 is at the 2nd speed ratio side.

To determine whether or not the shift lever is slowly operated from the N position to the D position, determination is made in this embodiment from a vehicle speed V and a rotation speed of a turbine 15 of a torque converter 13. Specifically, as shown in FIG. 5 and FIG. 7, there are provided an oil temperature sensor 67 for detecting the temperature of automatic transmission fluid, an output shaft rotation sensor 68 for detecting a rotation speed $N_o$ of a transmission output shaft 33, an input shaft rotation sensor 69 for detecting a rotation speed $N_i$ of a transmission input shaft 19, an inhibitor switch 70 for detecting the position of the shift lever, and a throttle opening sensor 71 for detecting an opening $\theta$ of a throttle valve (not shown) (hereinafter referred to as "throttle opening") of the engine 11, and detection signals from these sensors are outputted to ECU 56.

When an oil temperature T is above 0° C. according to the detection signal from the oil temperature sensor 67, the vehicle speed V is 0 km/hour according to the detection signal from the output shaft rotation sensor 68, and the rotation speed $N_i$ of the transmission input shaft 19 after one second from reception of a D signal from the inhibitor switch 70 according to the detection signals from the inhibitor switch 70 and the input shaft rotation sensor 69, ECU 56 determines that the shift lever is slowly operated from the N position to the D position. Furthermore, when the vehicle speed V is more than 5 km/hour according to the detection signal from the output shaft rotation sensor 68 and the throttle opening $\theta$ is greater than 10%, it is determined that the driver desires to start the vehicle.

In this case, when the oil temperature T is below 0° C., a different control corresponding to this condition will be performed in order to eliminate problems associated with a high viscosity of automatic transmission fluid. Control according to the present invention is performed only when the oil temperature T is higher than 0° C. so that the control according to the present invention does not interfere in such a different control. Furthermore, when the shift lever is operated from the N position to the D position and the vehicle is in a standstill condition, the rotation speed $N_i$ of the transmission input shaft 19 should be 0 rpm, and if the transmission input shaft 19 rotates at a certain speed, it can be regarded that the rear clutch 21 is not completely engaged. Therefore, control according to the present invention is performed when the rotation speed $N_i$ of the transmission input shaft 19 is higher than 205 rpm after one second from reception of a D signal from the inhibitor switch 70.

When the rotation speed $N_o$ of the transmission output shaft 33 is more than 300 rpm and the rotation speed $N_i$ of the transmission input shaft 19 becomes more than 1,000 rpm while the control of the present invention is performed to maintain the shift lever at the D position, since the hydraulic pressure supplied to the rear clutch 21 has sufficiently risen, and the rear clutch 21 can be regarded to be in a complete engagement, the control according to the present invention is released when the vehicle is restarted from this condition.

Figure 3:
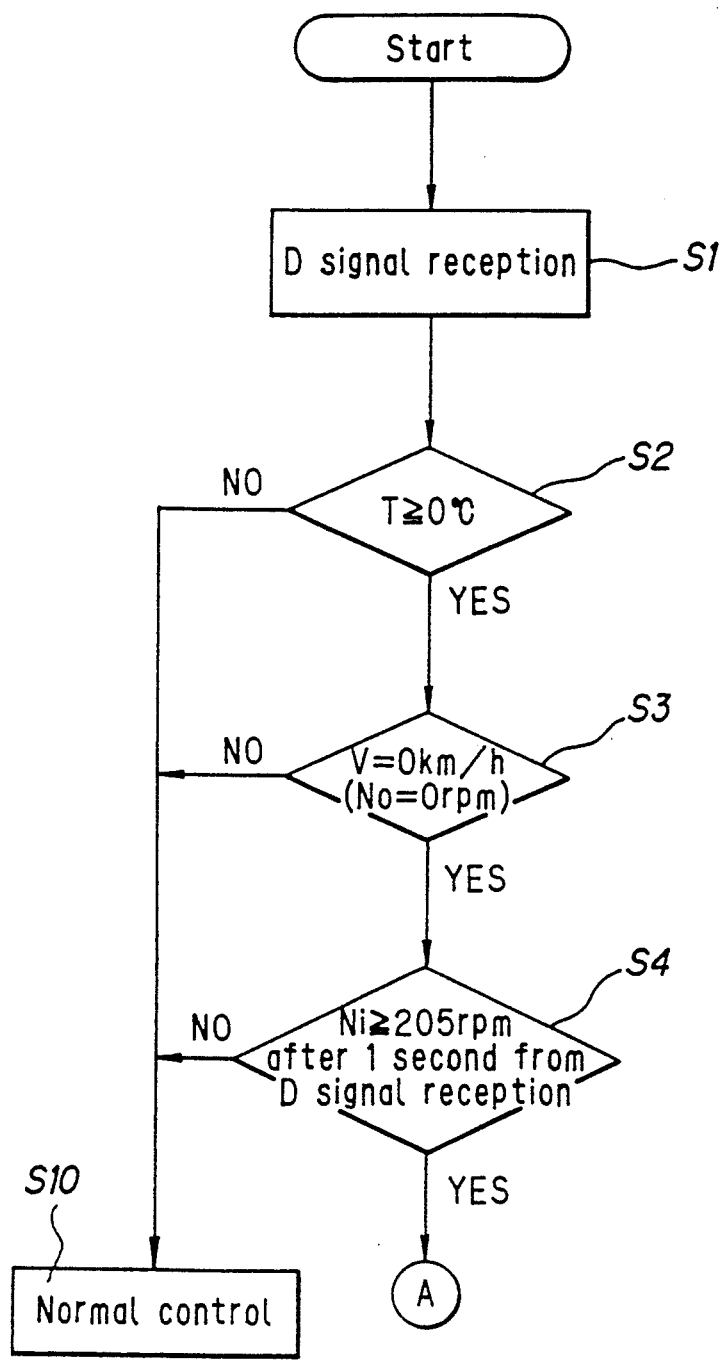
FIG. 3 and FIG. 4 are flow charts showing control flow of this embodiment.
Figure 4:
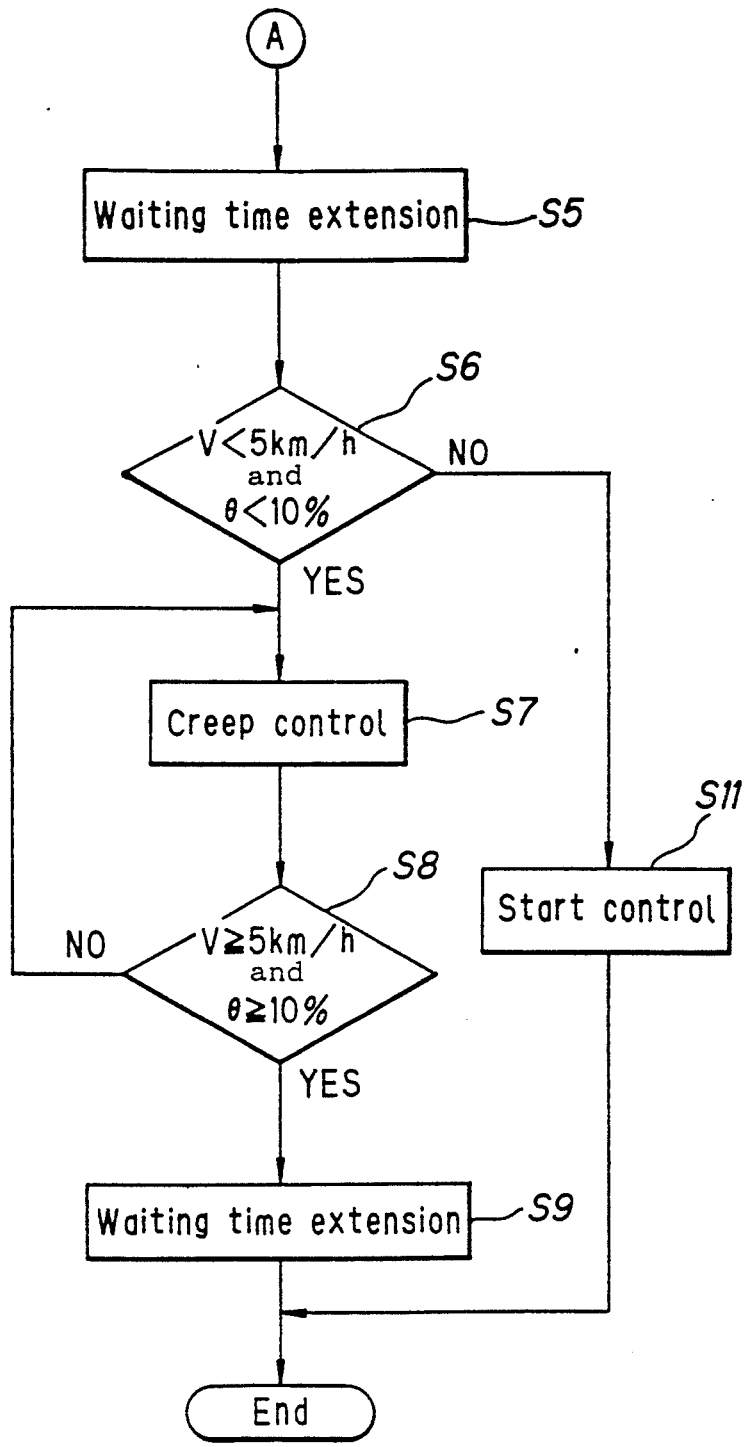

As shown in FIG. 3 and FIG. 4 showing the control flow of this embodiment, when ECU 56 receives a D signal from the inhibitor switch 70 in step S1, determination is made in step S2 as to whether or not the oil temperature T of automatic transmission fluid is above 0° C. according to a detection signal form the oil temperature sensor 67. When it is determined in step S2 that the oil temperature T of automatic transmission fluid is above 0° C., determination is made in step S3 as to whether or not the vehicle speed V is 0 km/hour. When it is determined in step S3 that the vehicle speed V is 0 km/hour, that is, the vehicle is in a standstill condition, determination is made in step S4 as to whether or not the rotation speed $N_i$ of the transmission input shaft 19 is more than 205 rpm after one second from receiving the D signal.

When it is determined in step S4 that the rotation speed $N_i$ of the transmission input shaft 19 is more than 205 rpm after one second from receiving the D signal, that is, the rear clutch 21 is insufficiently engaged, in step S5 the waiting time (3) in FIG. 1 to set the duty ratio of the hydraulic pressure control electromagnetic valve 57 to 0% is extended to (3)'. This extends the waiting time until complete engagement of the rear clutch 21 by the line pressure, and the operation transfers to the creep control in (4) and (5) in FIG. 1 with the rear clutch 21 in the course of engaging, thereby minimizing the possibility of creep pressure to be supplied to the rear clutch 21.

Then, determination is made in step S6 as to whether or not the vehicle speed V is less than 5 km/hour and the throttle opening $\theta$ is less than 10%. When it is determined in step S6 that the vehicle speed V is less than 5 km/hour and the throttle opening $\theta$ is less than 10%, that is, the driver does not desire starting the vehicle, creep control of (4) and (5) in FIG. 1 is performed in step S7 to duty control the hydraulic pressure control electromagnetic valve 57 at the 2nd speed ratio.

Furthermore, determination is made in step S8 as to whether or not the vehicle speed V is more than 5 km/hour and the throttle opening $\theta$ is more than 10%. When it is determined in step S8 that the vehicle speed V is more than 5 km/hour and the throttle opening $\theta$ is more than 10%, that is, the driver desires to start the vehicle, in step S9 the waiting time (7) in FIG. 2 to set the duty ratio of the hydraulic pressure control electromagnetic valve 57 to 0% from creep control of (5) and (6) is extended to (7)'. This even further increases the waiting time for engagement of the rear clutch 21, thereby achieving positive engagement of the rear clutch 21.

On the other hand, when it is determined in step S2 that the oil temperature T of automatic transmission fluid is below 0° C., that is, shift control at low temperatures is required, or when it is determined in step S3 that the vehicle speed V exceeds 0 km/hour, that is, the vehicle is not in a standstill condition, or when it is determined in step S4 that the rotation speed $N_i$ of the transmission input shaft 19 after one second from receiving the D signal from the inhibitor switch 70 is less than 205 km/hour, that is, engagement of the rear clutch 21 is almost completely achieved, in step S10 the hydraulic pressure control electromagnetic valve 57 is duty controlled as in the past, that is, with a normal timing as shown by the two-dot-bar line in FIG. 1 and FIG. 2.

Furthermore, when it is determined in step S6 that the vehicle speed V is not less than 5 km/hour and the throttle opening $\theta$ is not less than 10%, that is, the driver desires to start the vehicle, normal starting control is performed in step S11.

Alternatively, when the shift lever is slowly shift from N position to the D position, it is of course possible to use other methods than described in this embodiment. Moreover, it is of course possible to use vehicle automatic transmissions and hydraulic pressure control devices of different structures other than described in this embodiment, for example, those disclosed in U.S. Pat. No. 3,754,482 and U.S. Pat. No. 4,770,789.

The shift control apparatus for a vehicle automatic transmission according to the present invention can be used in vehicles equipped with vehicle automatic transmissions in which individual hydraulic pressures supplied to a plurality of frictional engaging elements are electronically controlled to achieve a plurality of speed ratios by selectively engaging these frictional engaging elements.

What is claimed is:

1. A shift control apparatus for an automatic transmission of a vehicle wherein a plurality of speed ratios are achieved by electronically controlling individual hydraulic pressures supplied to a plurality of frictional engaging elements to selectively engage these frictional engaging elements, comprising:

speed ratio select means for changing over the speed ratio of the vehicle automatic transmission from a neutral position to a running position;

operation condition determination means for determining operation condition of the vehicle;

an electromagnetic valve for controlling a hydraulic pressure supplied to a first frictional engaging element of said plurality of frictional engaging element to achieve a first speed; and electromagnetic valve control means for controlling operation of said electromagnetic valve so that when the speed ratio select means is determined by the operation condition determination means to be slowly manipulated, a supply time of a maximum hydraulic pressure to said first frictional engaging element is extended by a first predetermined time.

2. The shift control apparatus of claim 1 wherein:

said operation condition determination means comprises a speed ratio select means position detection means for detecting the position of said speed ratio select means, vehicle speed detection means for detecting a speed of the vehicle, and engine load detection means for detecting a load on an engine;

said electromagnetic valve controls individual hydraulic pressures supplied to said first frictional engaging element and to a second frictional engaging element of said plurality of frictional engaging elements achieving a second speed ratio in cooperation with said first frictional engaging element; and said electromagnetic valve control means has a first step for achieving the second speed ratio when the vehicle is in a standstill condition and the engine is under a low load after the extension by the first predetermined time, a second step for removing hydraulic pressure for a second predetermined time from said second frictional engaging element when an increase in load on the engine is detected, and a third step for achieving the first speed ratio by extending a supply time of a maximum hydraulic pressure to said first frictional engaging element.

3. The shift control apparatus of claim 1 wherein:
said operation condition determination means comprises a speed ratio select means position detection means for detecting the position of said speed ratio select means, input rotation speed detection means for detecting an input rotation speed of said speed ratio select means, and a vehicle speed detection apparatus for detecting a speed of the vehicle.

4. The shift control apparatus of claim 3 wherein said speed ratio select means is determined to be slowly manipulated when an output of said input rotation speed detection apparatus is determined to be higher than a predetermined value after a predetermined time from stoppage of the vehicle and changing over said speed ratio select means from the neutral position to a running position.

* * * * *